(12) United States Patent  
Arief et al.

(10) Patent No.: US 7,937,888 B2  
(45) Date of Patent: May 10, 2011

(54) FOLIAGE LIFTER

(75) Inventors: Hendra Arief, Surabaya (ID); Jason Wan Leong Lee, Enfield (AU); Andreas Prawiro, North Adelaide (AU); Antoni Blazewicz, Adelaide (AU)

(73) Assignees: Adelaide Research and Innovation Pty Ltd. (AU); Cyril Henschke Pty Ltd. (AU)

( * ) Notice: Subject to any disclaimer, the term of this patent is extended or adjusted under 35 U.S.C. 154(b) by 163 days.

(21) Appl. No.: 11/996,375

(22) PCT Filed: Jul. 19, 2006

(86) PCT No.: PCT/AU2006/001016  
§ 371 (c)(1),  
(2), (4) Date: May 8, 2009

(87) PCT Pub. No.: WO2007/009178  
PCT Pub. Date: Jan. 25, 2007

(65) Prior Publication Data  
US 2009/0293353 A1    Dec. 3, 2009

(30) Foreign Application Priority Data

Jul. 20, 2005    (AU) .............................. 2005203145

(51) Int. Cl.  
*A01G 17/04*    (2006.01)

(52) U.S. Cl. ........................................... 47/46

(58) Field of Classification Search ............... 47/1.01 R, 47/1.01 S, 22.1, 29.5, 44, 46, 47, 58.1 FV, 47/903  
See application file for complete search history.

(56) References Cited

U.S. PATENT DOCUMENTS

| | | | |
|---|---|---|---|
| 3,531,090 A * | 9/1970 | Laible ............................. | 256/10 |
| 4,703,584 A | 11/1987 | Chazalnoel | |
| 5,797,214 A | 8/1998 | Parrish et al. | |
| 2005/0044785 A1* | 3/2005 | Bai et al. ............................ | 47/46 |
| 2009/0293353 A1* | 12/2009 | Arief et al. ........................ | 47/47 |

FOREIGN PATENT DOCUMENTS

| | | | |
|---|---|---|---|
| FR | 2592757 A1 | | 7/1987 |
| FR | 2770966 A1 | | 5/1999 |
| SU | 604539 A | * | 4/1978 |
| SU | 1468472 A | * | 3/1989 |
| SU | 1759319 A1 | | 9/1992 |
| WO | 2001/024602 A2 | | 4/2001 |
| WO | WO 2006085185 A1 | * | 8/2006 |

* cited by examiner

*Primary Examiner* — Francis T Palo  
(74) *Attorney, Agent, or Firm* — Akerman Senterfitt

(57) ABSTRACT

A vineyard trellis system that includes a ground anchored upright post, at least one foliage wire passing by the post and having a supporting interengagement with the post, and lifting means arranged to effect a lifting or lowering of the wire in relation to the post where said lifting means include a support member slidably engaging with the post and engaging with the foliage wire, and a winch arrangement adapted to assist in a lifting or lowering of the support member to effect a change in height of the foliage wire with respect to the post.

8 Claims, 3 Drawing Sheets

FOLIAGE LIFTER

FIELD OF THE INVENTION

The present invention relates to a method and apparatus for the training, growth and harvesting of vine fruit, especially grapes.

In particular, the present invention relates to a vineyard trellis system that allows the controlled training, growing and harvesting of grapevines.

DESCRIPTION OF THE PRIOR ART

The growth and maintenance of vine crops, in particular grapevines, is paramount in the production process.

The grapevine itself is a relatively hardy plant that with appropriate training and pruning can produce prolific amounts of fruit. Therefore, to increase the quality and commercial production of the products of the vine, trellis wires are typically used to support the wood laid down and allow the shoots arising from it to be trained vertically, exposing leaves and fruit for quality improvement. The growth of the vine and the fruit are influenced by the amount of sunlight received by the vine leaves and the use of stakes and trellis wires are typically used to permit lateral branching of the grapevine canes from central vine root stock. This is also commonly referred to as vertical shoot positioned (VSP) trellis in which vine shoots grow upwards and across guide wires in a generally vertical plane aligned with the grapevine trunk.

The support of the grapevine foliage and the fruit in a vertically trellised system is typically accomplished by using foliage support wires connected to grape stakes. The stakes are simply driven into the ground and the foliage support wires attached to the grape stakes by nails or clips attached to the grape stake. Typically, there is at least one or two foliage support wires that are mounted on the grape stakes so that these movable foliage support wires can be adjusted over the particular growing season by the simple action of physically lifting the moveable foliage support wire from one set of connectors to another. In this way then, the foliage is raised upwards and the underlying fruit is subjected to increased amount of sunlight which can have a positive effect on the various characteristics of the fruit.

The process of manually lifting the foliage support wires from their lower position to an upper position, as the vine grows, is extremely taxing and time consuming especially for large scale situations in which there may be hundreds of rows required to be lifted.

This then is a very labour intensive operation which subsequently adds significant costs to the grape grower.

It has now been found by the present inventors that an improved vineyard trellis system is capable of significantly reducing the not insubstantial costs associated with management of vines.

OBJECT OF THE INVENTION

It is an object of the present invention to provide a vineyard trellis system useful in supporting vines.

It is a further object of the present invention to provide a vine trellis system for the support of vines that permits the growth of the vine and enhances growth and development of the vine as well as facilitate harvesting of the fruit.

It is yet a further object of the invention to provide a vine trellis system that allows for the optimum positioning of the fruit growing on the vine for mechanical harvesting equipment.

Another object of the invention is to provide a vine trellis system that allows the repositioning of the foliage support wires with minimal effort.

It is an object of the present invention to overcome, or at least substantially ameliorate, the disadvantages and shortcomings of the prior art.

Other objects and advantages of the present invention will become apparent from the following description, taking in connection with the accompanying drawings, wherein, by way of illustration and example, an embodiment of the present invention is disclosed.

SUMMARY OF THE INVENTION

According to the present invention, although this should not be seen as being the broadest form of the invention, there is provided a vineyard trellis system that includes a ground anchored upright post, at least one foliage wire passing by the post and having a supporting interengagement with the post, and lifting means arranged to effect a lifting or lowering of the wire in relation to the post where said lifting means include a support member slidably engaging with the post and engaging with the foliage wire, and a winch arrangement adapted to assist in a lifting or lowering of the support member to effect a change in height of the foliage wire with respect to the post.

In a further form of the invention, there is provided a vine trellis system with at least two spaced apart ground anchored upright posts and at least one laterally extending foliage wire extending between the said posts and being supported by each respective post by a support carriage which is supported by the respective post so that the said wire at a respective post location has two support positions for the said wire a first position being higher that a second position, and there being a lifting and lowering arrangement including for each post an elongate member secured to the support carriage slidably retained within the post and being connected to tension applying or releasing means.

In yet a further form of the invention there is provided a vineyard trellis system including at least two spaced apart ground anchored post, having a lower portion and an upper portion, at least one foliage wire extending laterally between the at least two spaced apart ground anchored posts, each post having a supporting member in sliding engagement therein, the supporting member adapted to securely engage the at least one foliage wire, and a lifting means to effect lifting or lowering of the supporting member, such that when in use each supporting member is operated at least substantially at the same time so that the at least one foliage wire can be raised or lowered with respect to the ground anchored post.

The vine post of the present invention is thus preferably a post capable of engaging securely, in a suitable manner, the ground such that the post is securely resilient to movement under tension normally applied by the weight of vine plants.

In preference, the supporting member has a sliding portion and a foliage wire holding portion.

In preference, the foliage wire holding portion is remote from the sliding portion.

In preference, the lifting means is a first wire rope attached to a winch, and a second wire rope, the second wire rope having a first and second end, wherein the first end is attached to the first wire rope and the second end is attached to the supporting member, such that by applying tension to the first wire rope, tension is applied to the second wire rope.

In preference, the supporting member is of integral construction.

In preference, the supporting member is adapted to at least partially reside within the ground engaging post, such that during lifting or lowering the sliding portion of the supporting member travels longitudinally along the inside of the post.

In preference, the lifting means is electronically controlled.

In preference, there is a pulley system located within the post.

In preference, the pulley system is further characterised in that the sliding portion has an upper portion with an aperture there through and a shaft passing through said aperture supporting at least one pulley wheel thereon and the post has at least one pulley located on the lower portion and at least one pulley located on the upper portion and a wire connecting said pulleys in an operable manner so that lifting of the sliding portion is facilitated.

In preference, the ground engaging post is "C"-shaped.

In preference, the winch is remotely controlled.

An apparatus for lifting a vine plant substantially as hereinbefore described with reference to the accompanying drawings.

BRIEF DESCRIPTION OF THE DRAWINGS

By way of example, an employment of the invention is described more fully the renown for with reference to the accompanying drawings, in which.

DETAILED DESCRIPTION OF THE INVENTION

Figure 1:
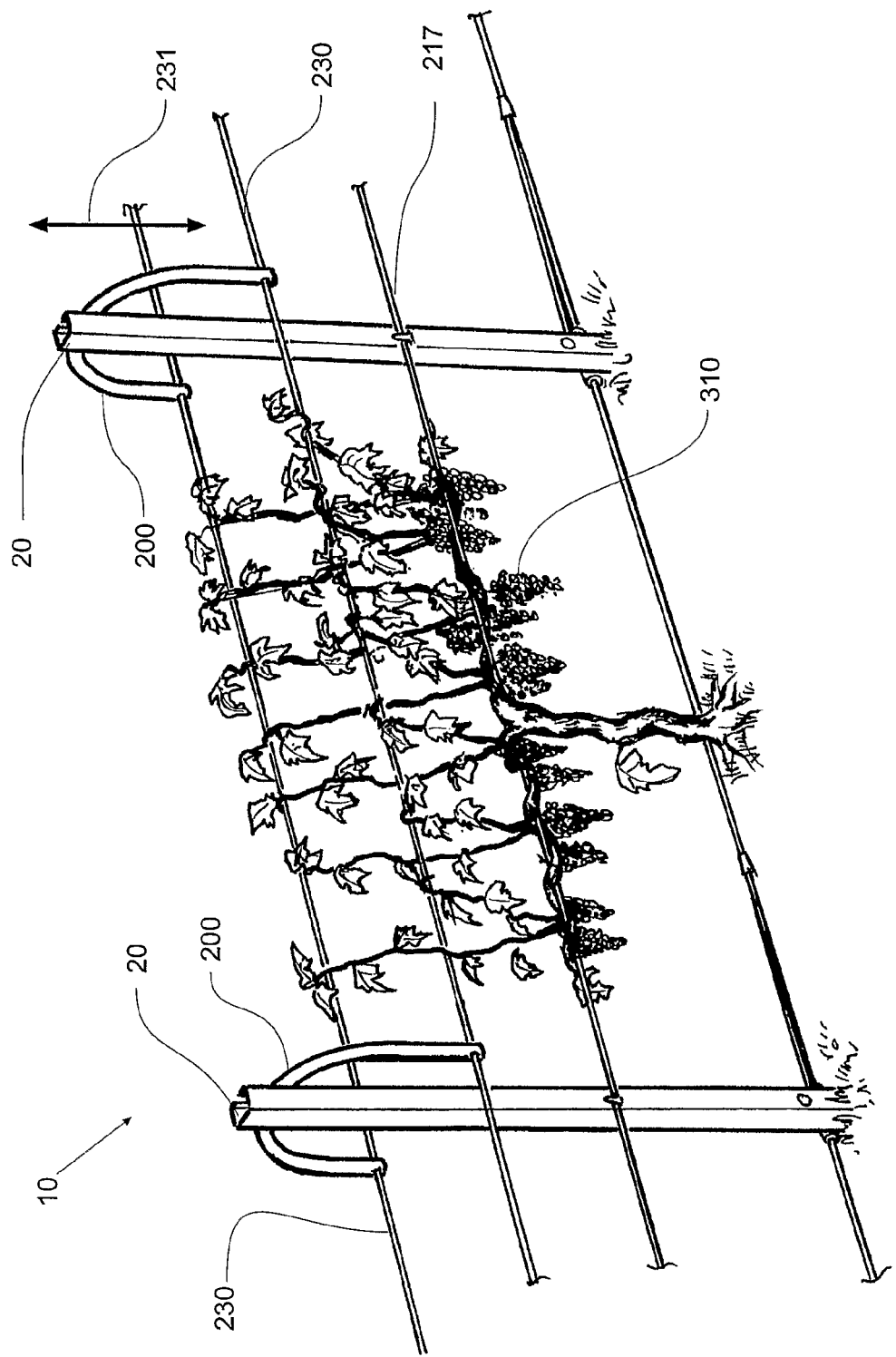
FIG. 1 is a pictorial representation of a grapevine, with the trellis system in a raised position.

Referring now the drawings, wherein like reference numerals designate identical or corresponding parts throughout the featured figures, there is a vineyard trellis system 10, which includes a ground anchored post 20. The post 20 has an upper portion 25 and a lower portion 30 suitable for anchoring into the ground. The lower portion 30 may be forcibly driven into the ground or otherwise anchored by placing in a hole and securing with cement or similar.

Figure 2:
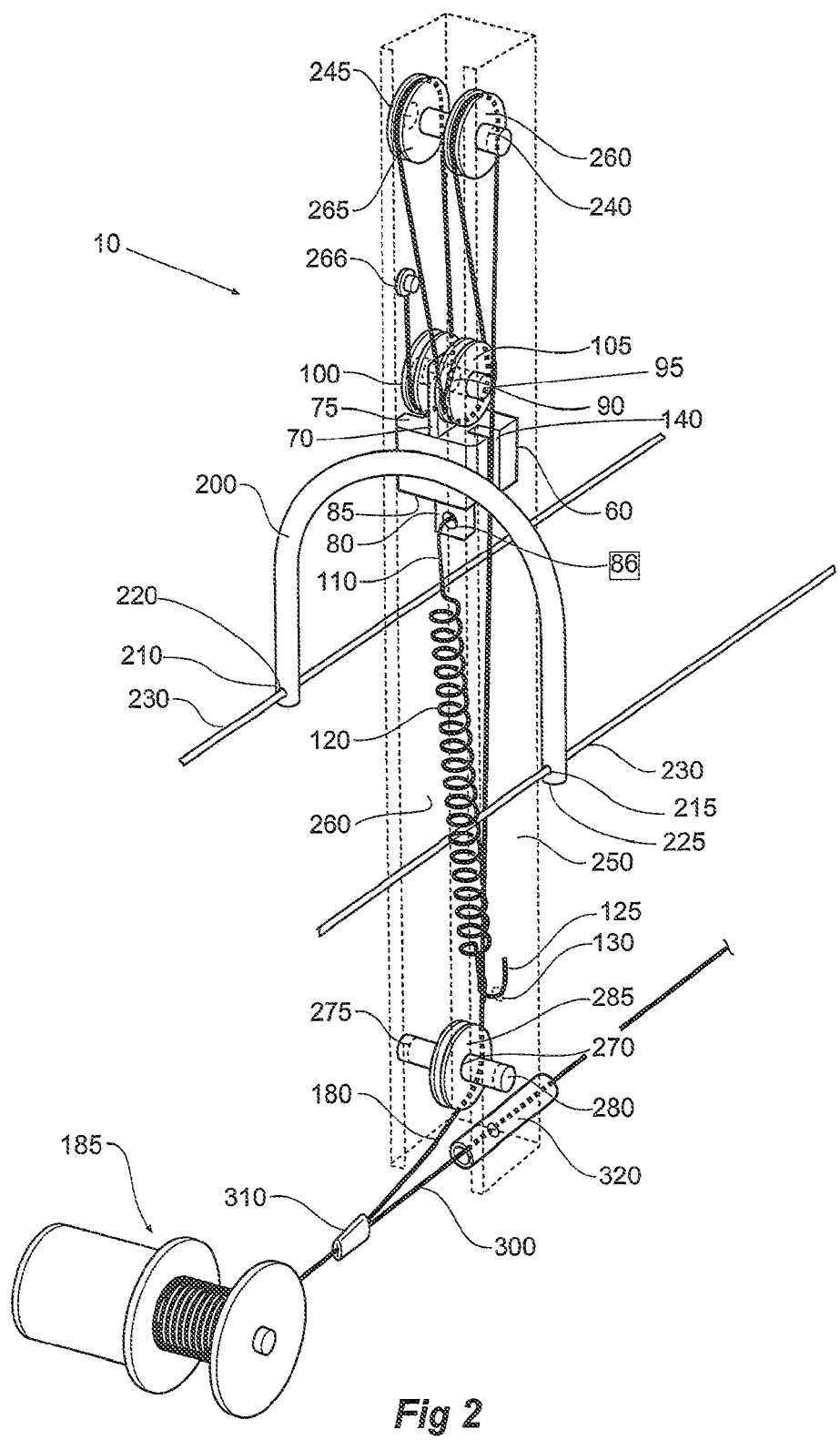
FIG. 2 is a pictorial representation of an embodiment of the invention showing a cut away view of the post.

The post 20 is "C"-shaped (shown in FIG. 2 in outline), having a slot 40 traversing longitudinally from the upper portion 25 the lower portion 30, punctuated by the bridging section 50, added to increased stability and internal strength of the post 20. The bridging section 50 is positioned within the lower portion 30 of the post.

The post 20 is made from a suitable resilient material such as galvanized steel to enable it to withstand repeated exposure to the elements and general agricultural impacts. Other materials may well be employed such as high impact plastics or similar with minor changes in shape to ensure that post 20 remains rigid.

The post 20 has flanges 32 and 34 at either side of the slot 40. The flanges 32 and 34 assist in holding the slider 60 within the confines of the post 20. If required a protective cover may be attached to the post 60 so as to cover the slot 40 to provide better protection to the inside of the post 20 from weather elements such as rain and dirt.

The slider 60 is shaped so as to allow relatively unrestricted vertical movement 231 within the interior of the post 20. The slider 60 has an upper projection 70 positioned on an upper surface 75, and a lower projection 80 positioned on the lower surface 85. The upper projection 70 has an aperture 90 through it for receiving a shaft 95 in a rotating manner. The shaft 95 shaped to accommodate pulley wheels 100 and 105 on either side of the upper projection 70.

The lower projection 80 has an aperture 86 for receiving an end of a biasing means, such as the hook end 110 of spring 120 is a secure manner. Hook end 125 of spring 120 is inserted in aperture 130 located on the lower portion 30 of post 20.

Figure 3:
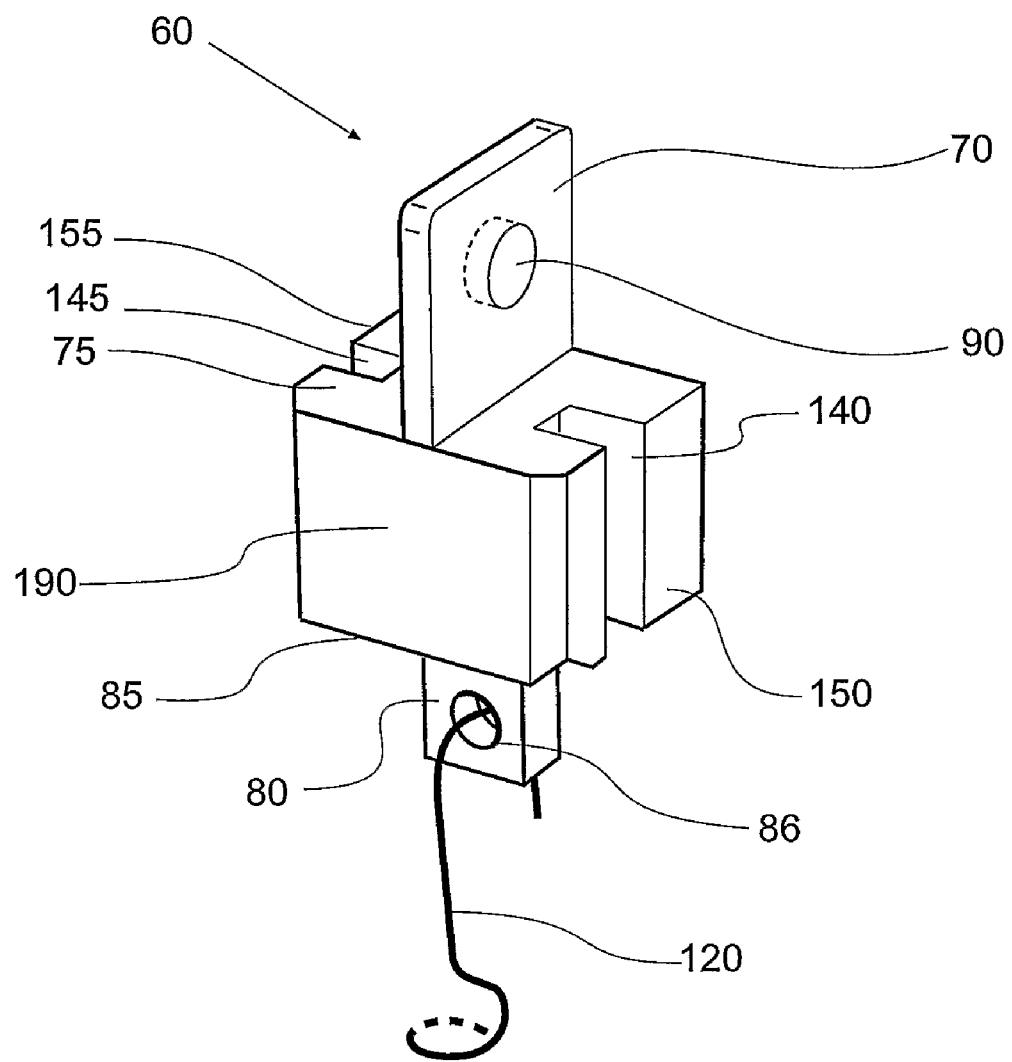
FIG. 3 is a perspective view of the slider section that fits within the trellis system.

As shown in FIG. 3, the slider 60 has recesses 140 and 145 on sides 150 and 155 respectively. The recesses 140 and 145 allow for the passage or movement of pulley wires 180. The front surface 190 of the slider 60 has a foliage wire holding portion 200 in an inverted "U"-shape. Located at each remote end 210 and 215 are apertures 220 and 225 for receiving foliage wire 230 there through. It would be well appreciated that the shape of the apertures 220 and 225 can vary to other shapes such as slots or recesses that allow for the secure attachment of foliage wire to the ends 210 and 215. In some instances, a slot may be preferable in that it allows for the easy removal of the foliage wire 230 from 200.

It is to be understood that the foliage wires 230 run the entire length of the row and the number of posts 20 required in each row is dependant on the size of each row.

The foliage wire holding portion 200 may be a separate member that is welded to the slider 60 or it may be of integral construction such as from a mounding.

The post 20 has apertures 240 and 245 positioned on sides 250 and 260 on the upper portion 25. The apertures 240 and 245 are shaped to receive a shaft 250 that accommodate pulley wheels 260 and 265 within the post 20. Additionally, there are apertures 270 and 275 positioned on sides 250 and 260 located on the lower portion 30. A shaft 280 is received within the apertures 270 and 175 and a pulley wheel 285 is rotatably connected thereto. Note that each pulley wheel has a groove around its circumference shaped to assist in keeping the pulley wire 180 in position.

Pulley wire 180 is attached to a winch 185 and passes around pulley wheel 285 through the inside of the post 20, and through the recess 140 to pass to the side of pulley wheel 105. The wire 180 then travels up to pulley wheel 260, down to pass around pulley wheel 105, back up to pulley wheel 265, then back down to pulley wheel 100. Finally, the wire 180 travels to a fixed point 266 located on the upper portion 25 of the post 20. This then describes a pulley system that is commonly referred to as a "block and tackle", of which the mechanical advantages are well known. Other types of pulley systems could also be employed with departing from the scope of the invention, such as systems of six pulley wheels.

In use, the post 20 is securely mounted in the earth, either by forcing the post 20 directly into the earth or by excavating the soil and cementing the post 20 therein. In either case the post 20 must be mounted such that it will be able to withstand the usual forces encountered in an agricultural environment such as bearing the weight of the fully laden vine plant as well as being struck by machinery and so on.

The growing vine plant 300 attaches to the foliage wire 230. As the vine plant 300 grows over time the foliage wire holding portion 200 can be raised so as to open up the vine plant and provide increased exposure of the fruit 310 to the sun. As the vine plant 300 continues to grow, so the foliage wire holding portions 200 can be raised until such a time that harvesting of the fruit occurs and the vines are pruned then the foliage wire holding portions 200 can then be lowered. The resultant exposure of the fruit 310 further facilitates the process of mechanical harvesting.

The spring 120 attached to the lower portion 30 of the post 20 and the slider 60 provides a biasing means that assists in the return of the slider 60 to its position when the tension in the wire 180 is released.

The vine trellis system 10 can be utilized so that each of the post in a row is capable of lifting a vine plant positioned between each post. That is each post is equipped with a pulley set (or lifting mechanism) and is connected to the winch that is set up at the end of each vine row. The technique employed then would be that each pulley wire 180 is connected to a synchronisation wire 300 by way of a swage connection 310.

The synchronisation wire 300 then passes through the conduit 320 positioned on the post 20 and on to the next post having a pulley mechanism contained therein as described above. In this way as the synchronisation wire 300 is taken up by the winch 185, each of the pulley wires 180 are also pulled thus lifting each of the foliage wire holding portions 200 in unison. Although the wires 300 and 180 are joined together by a swage 310, it is understood that other mechanisms of joining the wires can be applied without departing from the scope of the invention.

Alternatively, the pulley mechanism may only be present in each second or third post, if appropriate; to provide the necessary lifting force required to lift the vine shoots. Those posts without the pulley system still have the slider 60 therein so that it can then travel freely within the post 20. As can be immediately recognized, this would add to the cost savings and simplicity of the system by having less "lifting" posts per row.

In use, the vine cane is attached to the cordon wire 217 and the growing vine shoots are then attached to the foliage wires 230. As the vine shoot grows the wires 230 are raised by the supporting members 200 through activation of the pulley mechanism in the trellis system 10. This then more effectively exposes the foliage of the vine to the sun and further provides more effective canopy management.

The current invention as described can also employ additional foliage wire holding portions to hold additional foliage wires to accommodate vine growth.

The current vine trellis system also lends itself to be part of a total horticultural management system, and can be controlled be a single operation point, thus saving on labor costs and reducing injuries to workers. Another advantage is that the described system is modular in that it can be adapted to various vine plants, or other plant systems in which there is a need to provide such lifting of the canopy.

Although the invention has been herein shown and described in what is conceived to be the most practical and preferred embodiment, it is recognized that departures can be made within the scope of the invention, which is not to be limited to the details described herein but it is to be accorded the full scope of the appended claims so as to embrace any and all equivalent devices and apparatus.

The invention claimed is:
1. A vineyard trellis system including:
   at least two spaced apart ground anchored posts, each having a lower portion and an upper portion,
   at least one foliage wire extending laterally between the at least two spaced apart ground anchored posts,
   each post having a supporting member in sliding engagement therein, the supporting member adapted to securely engage the at least one foliage wire, the supporting member having a sliding portion and a foliage wire holding portion, the foliage wire holding portion being remote from the sliding portion, and
   a lifting means to effect lifting or lowering of the supporting member, wherein the lifting means is a first wire rope attached to a winch, and a second wire rope, the second wire rope having a first and second end, wherein the first end is attached to the first wire rope and the second end is attached to the supporting member, such that by applying tension to the first wire rope, tension is applied to the second wire rope,
   such that when in use each supporting member is operated at least substantially at the same time so that the at least one foliage wire can be raised or lowered with respect to the ground anchored post.

2. The vineyard trellis system as claimed in claim 1, wherein the supporting member is of integral construction.

3. The vineyard trellis system as claimed in claim 2, wherein the supporting member is adapted to at least partially reside within the ground engaging post, such that during lifting or lowering the sliding portion of the supporting member travels longitudinally along the inside of the post.

4. The vineyard trellis system as claimed in claim 3, further including a pulley system located within the post.

5. The vineyard trellis system as claimed in claim 4, wherein the sliding portion has an upper portion with an aperture there through and a shaft passing through said aperture supporting at least one pulley wheel thereon and wherein the post has at least one pulley located on the lower portion and at least one pulley located on the upper portion and a wire connecting said pulleys in an operable manner so that lifting of the sliding portion is facilitated.

6. The vineyard trellis system as claimed in claim 1, wherein the ground engaging post is "C"-shaped.

7. The vineyard trellis system as claimed in claim 1, wherein the lifting means is electronically controlled.

8. The vineyard trellis system as claimed in claim 7, further including a remote controller for controlling the winch.

\* \* \* \* \*